2,956,970

PROCESS FOR PREPARING POLYMERIC METHYL METHACRYLATE, IRON OXIDE CONTAINING COATING COMPOSITIONS

Henry W. Godshalk, Flushing, Mich., assignor to E. I. du Pont de Nemours and Company, Wilmington, Del., a corporation of Delaware No Drawing. Filed Oct. 1, 1957, Ser. No. 687,363

3 Claims. (Cl. 260—23)

This invention relates to liquid coating compositions and particularly to a method of preparing such compositions from certain iron oxide pigments and certain acrylic resins.

It is known in the lacquer and enamel art that colloidal hydrous iron oxides can be used as pigments in some coating compositions to produce unusually durable compositions having the additional advantages of clarity or transparency and low tinting strength. These properties have led the organic coating industry to use these pigments particularly in the currently popular polychromatic or metallic automobile finishes based on such film-forming materials as oil-modified alkyd resins blended with nitrocellulose, alkylated urea formaldehyde resins, or alkylated melamine formaldehyde resins.

As demand increased and as improvements over the conventional pigment "grinding" or dispersing processes, such as the flushing process of U.S. 2,140,745, became desirable, there was developed a class of colloidal hydrous iron oxide pigments modified by treatment with higher fatty acids like lauric, caprylic, coconut oil acids and sometimes additionally a naphthenic acid. The resulting products have been available to the coating industry as dispersions in liquid hydrocarbons like toluene, or in similar liquids, which are commonly used as solvents or diluents in lacquers or enamels. It is with the use of these higher fatty acid-treated hydrous iron oxide pigments in acrylic resin compositions that the present invention is concerned.

With the advent of acrylic resin topcoat finishes which can be sprayed satisfactorily at high solids content and which are especially useful for automobile bodies, it became desirable to employ in them the unusual combination of clarity or transparency, durability and low tinting strength which hydrous iron oxide pigments have provided in prior well known lacquers and enamels. Unfortunately, it was found that neither the old colloidal hydrous iron oxide pigments nor the newer fatty acid treated ones could be similarly formulated to give the desired combination of properties with the special acrylic resins required. The dispersions resulting from the known techniques of ball milling, roll milling, stone milling, kneading, flushing, sand grinding and the like all yielded cloudy non-transparent products, the cloudiness appearing either in the fluid dispersions or the coatings prepared therefrom, or both.

I have found a solution to this problem. According to my invention, a dispersion of fatty acid treated colloidal hydrous iron oxide pigment, of the kind mentioned heretofore, in a liquid diluent, preferably toluene, xylene, or the like, is first mixed in certain proportions with a solution of a methyl methacrylate polymer of specified relative viscosity. The mixture is then ripened or aged, during which operation something occurs, which I do not fully understand, to provide a clear pigment-polymer-solvent dispersion which in turn yields a clear film when it is applied as a thin coating and dried.

Surprisingly, even though the starting iron oxide pigment dispersion and the polymer solution (both being at concentrations ordinarily suitable for other purposes) are clear and usually yield a clear mixture, unless the proportion and concentration limits and the ripening step of my invention are followed, dry coatings derived from such mixtures are not clear. However, even such deficient mixtures can be made to yield clear films, according to my invention, by simply adjusting the concentrations of the components and ripening or aging the mixture.

What I have referred to herein as ripening or aging means holding the iron pigment-polymer-solvent mix either in a quiescent or an agitated state, with or without heating, for a period of time, all as more fully set out hereinafter, during which the character of the mix changes so that clear dry films are obtainable therefrom.

More particularly, in the practice of my invention a clear transparent coating composition consisting essentially of a polymer of methyl methacrylate, as the essential film-forming material, and a colloidal hydrous iron oxide pigment is obtained by the method which comprises mixing with a clear dispersion of a fatty acid treated colloidal hydrous iron oxide pigment in a volatile organic liquid, a clear solution of a polymer of methyl methacrylate having a relative viscosity of 1.117–1.196 in proportions such that the weight of said polymer is at least equal to the weight of said pigment and, based upon the total weight of the resulting fluid mix, the pigment constitutes up to 15% and the non-volatile solids constitutes up to 35%, said fluid mixture being clear but, as freshly prepared, yielding a cloudy film when applied as a coating and dried; and ripening said mixture until it yields a clear film when applied as a coating and dried.

Although some improvement in clarity or transparency can be obtained using ingredients and proportions slightly outside the limits specified above, operation within those limits is important if one is to obtain optimum improvement without objectionable sacrifice in other requirements. In this sense, the limits are critical.

The polymers of methyl methacrylate useful in making the compositions of the invention are either homopolymers of methyl methacrylate or copolymers with minor amounts, for example, in the order of 2 to 25% by weight, of another material copolymerizable therewith, for instance, acrylic acid, methacrylic acid, the 1 to 4 carbon alkyl (i.e., methyl to butyl) esters of acrylic acid, the 2 to 4 carbon alkyl (i.e., ethyl, propyl, and butyl) esters of methacrylic acid, glycidyl methacrylate, and styrene. A preferred copolymer contains about 98% of methyl methacrylate and 2% methacrylic acid. Thus the term "polymer or methyl methacrylate" and related terms, as used herein, refer to such homopolymers and copolymers as well as mixtures of homopolymers, mixtures of copolymers, and mixtures containing both homopolymer and copolymer.

Polymers of methyl methacrylate for use in this invention can be prepared according to well known methods by polymerizing methyl methacrylate monomer, with or without another monomer copolymerizable therewith, either in bulk, in solution, or in granular form to produce products having the required relative viscosity.

The polymers of methyl methacrylate suitable for use in the compositions of this invention are further characterized by having a relative viscosity of about 1.117 to 1.196 as indicated above and, more preferably, of about 1.148 to 1.183. These relative viscosity ranges correspond to molecular weight ranges, calculated as shown hereinafter, of about 55,000 to 105,000 and about 75,000 to 95,000, respectively. While these ranges are not known to be critical with respect to obtaining excellent dispersions, they define the most useful polymers from which coating compositions can be made having the properties required by industry, for example, sprayability at a suitable viscosity and a high solids content without cobwebbing, ability to build up a suitably thick film in one to three coats, and ability to yield a smooth coating free of sagging or curtaining on sloping or vertical surfaces. Thus, these relative viscosity ranges are critical to the extent that they define optimum limitations of acrylic resin lacquers of this invention having all of the aforementioned requisite properties.

The term "relative viscosity," as used herein, is the value obtained by dividing A, the efflux time of a solution of the polymer of methyl methacrylate, by B, the efflux time of the solvent used in making said solution, the efflux times being measured in accordance with the procedure of ASTM-D-445-46T Method B using, as the polymer solution, a solution of 0.25 gram of the polymer of methyl methacrylate being tested in 50 cc. of ethylene dichloride and, as the solvent, ethylene dichloride alone. The efflux times are determined at 25° C. in a standard apparatus currently marketed under the designation of a modified Ostwald viscosimeter, series 50.

The molecular weight values referred to herein are weight average molecular weights and are calculated from the equation $$M = 1.47 \times 10^6 (N_r - 1 - \ln N_r)^{0.65}$$

where M is the molecular weight, ln is the abbreviation of "natural logarithm" and $N_r$ is the relative viscosity, $A/B$, as defined above.

Any of the well known solvents for methyl methacrylate polymers can be used in making the clear solution of methyl methacrylate polymer for mixture with the iron oxide pigment dispersion according to the processes of this invention. Preferred are the aromatic hydrocarbons such as toluene, xylene, benzene and the like. Other suitable solvents include, for example, ketones such as acetone, esters such as ethyl acetate, and ether alcohol such as ethylene glycol monoethyl ether. Aliphatic hydrocarbons and highly polar organic liquids are generally poor solvents for methyl methacrylate polymers and are not used unless sufficient other solvent is present to dissolve the polymer.

The fatty acid treated colloidal hydrous iron oxide pigments useful in this invention are of the kind used heretofore in making coating compositions and are therefore well known in the coating art. Illustrative of such pigments that are commercially available are, for example, the proprietary products "Midas Gold" RL-2344 and "Midas Gold" 6289 (both from RBH Dispersions division, Interchemical Corporation), and "Gold Paste" 5857 (B. F. Goodrich Chemical Company, Harmon Color Works).

Alternatively, fatty acid treated colloidal hydrous iron oxide pigments can be prepared from the water-wet press cakes or watery slurries (pulps) of unmodified colloidal hydrous iron oxide pigments supplied by various pigment manufacturers. Or, if desired, the pigments can be made from the basic raw materials by precipitation of fine colloid-size particles according to conventional techniques. In either of the latter two instances, the wet colloidal precipitate is heated with the higher fatty acid in the presence of a volatile organic solvent used in coating compositions, for example, toluene or xylene, to remove water by distillation until there remains a substantially water-free dispersion in the solvent of colloidal hydrous iron oxide particles coated or surface-reacted with fatty acid. Solvent removed along with water in such distillation operation will normally be condensed, separated from the water and returned as reflux.

More specifically, the patent art teaches several formulas and procedures for treating colloidal hydrous iron oxide precipitates with higher fatty acids (i.e., at least four carbon atoms) such as caprylic, lauric, myristic, palmitic, stearic, castor oil acids, tall oil acids, coconut oil acids and the like, or with naphthenic acids, or with mixtures thereof to obtain modified iron oxide pigments of the kind used in practicing the present invention. For such a teaching see, for example, Kumins and McNesby U.S. 2,575,347. Another convenient method, not specifically disclosed elsewhere to my knowledge, is described in Example 1 hereafter, and it will be appreciated that still other known or analogous methods and fatty acid treated colloidal hydrous iron oxide pigments can be used according to this invention.

The term "colloidal hydrous iron oxide" as used herein means a colloidally subdivided precipitate prepared by treating a water solution of a ferric salt, such as ferric chloride or ferric sulfate, or a ferrous salt oxidized in situ to the ferric state, with an alkaline precipitating agent, such as ammonium hydroxide, filtering and washing the precipitate substantially free of soluble by-products. It is not to be confused with non-colloidal large particle size iron oxide or hydrated iron oxide pigments, like ferrite yellow.

Any of the wide variety of volatile organic liquids conventionally used in coating compositions can be used as the dispersant liquid in making an iron oxide pigment dispersion for mixture with the solution of methyl methacrylate polymer according to the processes of this invention. Preferably the volatile organic liquid used is one which is a solvent for the methyl methacrylate polymer such as those mentioned heretofore as solvents for the polymer. Most preferably, the dispersant liquid is an aromatic hydrocarbon such as toluene, benzene and xylene. Of course, liquids which are incompatible in the resulting mix, that is, liquids which tend to cause precipitation of the polymer such as aliphatic hydrocarbons are to be avoided or used in such relatively small amounts that the polymer is not precipitated.

The term "clear" as used to refer to the characters of the acid treated hydrous iron oxide pigment dispersion and the polymer solution which are mixed in the practice of this invention means the absence of cloudiness or haze and the ability of a sample, as in a glass test tube having a small (e.g., ca. ½ inch) bore, to transmit sharp (as distinguished from fuzzy) images. Freedom from color is not a requirement. As pointed out hereinabove, in combining these clear starting materials the proportions must be such, if optimum results are desired, that the amount of said pigment does not exceed the weight of the acrylic polymer and does not exceed 15% of the total weight of the mixture, and such that the total amount of non-volatile solids in the mixture does not exceed about 35% of the total weight of the mixture. Although small amounts of innocuous additives, such as plasticizer, can be present, the components are preferably limited to the solvent for the polymer and, as the non-volatile components, the pigment and polymer. I have found that, for reasons I do not fully understand, exceeding these limits gives mixtures which do not become clear, do not yield clear coatings, or which require an impractical ripening period, for example two weeks, before doing so. I have not found any minimums, within the proportions indicated above, below which the effect of my process does not occur, but the undesirability and economic disadvantages of working at low concentrations, when higher ones can be used, are obvious to those skilled in the art.

The proportions used in making the pigment-polymer-solvent mix preferably are: Pigment at 25%–75% of the weight of the polymer and 3%–10% of the total weight of the mixture; and total non-volatile solids (usually only the pigment plus the polymer) at 10%–25% of the total weight of the mixture.

The above defined mixtures, as freshly prepared, are clear but almost invariably yield cloudy films when cast as thin coatings and dried. However, unexpectedly, the ripening or aging steps of my process converts them into a state in which, without other evidence of change, they yield clear films. Ripening can be effected by simply storing the mixture at room temperature, but it is hastened by either agitation or warming to a moderately elevated temperature such as 80° up to about 125° F.

A combination of agitation and warming produces the desired results fastest. For example ripening which may take 16–24 hours at room temperature can be reduced to 6–8 hours by agitation or warming and can be further reduced to 2–3 hours by both agitation and warming.

Since both the starting pigment dispersion and the starting polymer solution are usually available or most easily manufactured at concentrations in the range of 40%–60%, and the permissible proportions in the mixtures of this invention are low by comparison, it is usually necessary to add solvent somewhere in the process. This can be done by appropriately diluting either or both starting materials as desired, followed by blending, or, alternatively, the relatively concentrated starting materials can be blended, followed by dilution. However, I prefer to add the necessary solvent to the pigment dispersion and further prefer to do so slowly and with agitation. Polar solvents such as ketones, esters and alcohols, if used in combination with relatively non-polar solvents such as hydrocarbons, should be added after all of the non-polar components have been added. The polymer solution is then added slowly with agitation. After the components are all together, agitation can be increased to a point where a vortex and considerable splashing occur. Such violent agitation appears to hasten the ripening process. Heating can be applied, if desired, during any or all of these steps, but care should be taken to avoid local overheating.

The period of time required to effect the ripening depends upon several variables, as has been mentioned, but whether or not a given mix has ripened is easily determined by the following simple test:

A sample of the mix to be tested is flooded out on to a clean glass panel to give a film about 0.7–1.5 mils thick when dry. The dry film on the panel is observed by looking thru it while interposing it between one's eyes and a light source or light reflecting background (daylight, northern exposure is excellent for this purpose). If there is pronounced cloudiness, the mix has not ripened. If, on the other hand, the film is substantially free of cloudiness, the ripening is sufficiently complete for most purposes although complete clarity can usually be obtained by ripening still longer.

I have found the foregoing simple and practical test sufficient for determining the minimum ripening periods to be used for various proportions and ripening conditions but if a more precise measure of clarity or amount of cloudiness in the films is desired, this can be obtained using a Leeds and Northrup Angular-Dependence Scattered Light Measuring Apparatus. This apparatus is used according to the standard method described in Leeds and Northrup pamphlet D.B. 2093 using glycerine in the cell as described therein in contact with the dry film on the glass panel. Thus the light transmitted thru the film or coating on the axis of the specular beam, I, is measured and the light transmitted thru the system in the absence of the film in the beam, Io, is similarly measured. The quotient $I/Io$ represents the light transmitted, T. A numerical measure of clarity, C, is then determined by substitution of the light transmission, T, and the film or coating thickness, $d$, in the following equation:

$$C = \frac{1}{d} \ln \frac{1}{T}$$

which equation is derived from the equation $$I = Io e^{-(C)d}$$

where C, the clarity value, is the sum of $\alpha$, the absorption coefficient of the film, and $\beta$, the scattering coefficient of the film. (See Jenkins and White, Fundamentals of Physical Optics, page 271, McGraw-Hill, 1937.)

The greater the clarity of the film being examined, the lower the clarity value, C, as determined according to the method described above. Films having a clarity value of about 2.5 exhibit a very slight cloudiness when viewed according to the simple visual test first mentioned above but they and all films having lesser clarity values indicate that the mix from which they have resulted has ripened according to the process of this invention. Films having clarity values of about 1.0 and less are exceptionally clear.

Upon completion of ripening, the product can be used directly as a coating composition to provide clear coatings. Normally, however, it is used as an intermediate for blending with other components to give a more complex composition. For example, it can be blended with additional methyl methacrylate polymer, or additional other film-forming material, such as nitrocellulose, additional pigments for appearance characteristics and/or hiding power in the dry coatings, plasticizer, special solvents for optimum spraying properties, and other modifiers well known in the art. Such blends can be made in accordance with conventional coating composition formulating practices, the ripened iron oxide pigment-containing composition serving in such case to provide that pigment in a form or state in which its desirable attributes can be fully realized in the resulting polyacrylate-containing coating composition.

In order that the invention may be better understood, the following examples illustrating compositions of the invention, their preparation, application, and use are given in addition to the examples already given above. Parts and percentages are by weight unless otherwise specified.

EXAMPLE 1

*Preparation of fatty acid treated colloidal hydrous iron oxide pigment*

A fatty acid treated colloidal hydrous iron oxide pigment dispersion in volatile hydrocarbon is prepared by treating 463 parts of a colloidal hydrous iron oxide precipitate (as a slurry in about 900 parts of water, sold by E. I. du Pont de Nemours and Company under the proprietary name "Auric Brown Pulp" F–4–P) with 159 parts of refined coconut oil fatty acids in the presence of 378 parts of xylene. Coconut oil fatty acids comprise the following acids: lauric, myristic, palmitic, capric, oleic, caprylic, stearic, palmitoleic, caproic and arachidic.

In carrying out the acid treatment, the acids and xylene are mixed and heated with agitation to about 50° C. and are held at this temperature until the acid is in solution. Then the colloidal hydrous iron oxide slurry is added slowly with agitation to produce a homogeneous mixture. This is held at 50°–60° C., with agitation for about 1 hour. Heating and agitation are discontinued. Solids gradually settle and after about 30 minutes, supernatant water is decanted. Then the remaining material is heated to remove water by distillation. The distillate is condensed, water therein separated from xylene and removed from the system, and the xylene is returned to the distillation vessel. Distillation is continued until water no longer comes over. The still liquor temperature during this operation increases from about 90° C. to 135° C. The resulting product is a clear dispersion containing about 60% by weight of fatty acid treated colloidal hydrous iron oxide.

*Preparation of pigment dispersion in polymer of methyl methacrylate*

A clear dispersion of the fatty acid treated pigment produced above in a polymer of methyl methacrylate, which dispersion ultimately yields a clear dry coating in accordance with this invention, is prepared using the following components in the proportions indicated:

| | Parts |
|---|---|
| Pigment dispersion in xylene (60% solids, as prepared above) | 66.7 |
| Toluene | 427.3 |
| Polymer of methyl methacrylate (40% solution in acetone and toluene) | 200.0 |
| | 694.0 |

The polymer of methyl methacrylate is a copolymer of methyl methacrylate and methacrylic acid in a methyl methacrylate to methacrylic acid weight ratio of 98:2. The polymer has a relative viscosity of 1.1301.

The toluene is added slowly to the pigment dispersion in xylene with agitation. Then the methyl methacrylate polymer solution is added to the resulting mixture with agitation. A sample of the clear product at this stage is taken and flowed out on a clean clear glass panel. Agitation is continued at room temperature, about 70° F., and additional samples are flowed out after 2, 4 and 6 hours respectively. The clarity of the samples is compared by inspecting the dry coatings thereof in front of strong illumination. Their comparative clarities are as follows, based on an arbitrary but uniform preestablished scale of 0–10, in which 0 is opacity or complete hiding and 10 is substantially perfect clarity or transparency (i.e., corresponds to a clarity value, C, of about 1.0 or less). In this scale, 8 corresponds to a clarity value, C, of about 2.5–2.0, and such 8 or higher is satisfactory for the purposes of this invention.

| Hours of ageing: | Clarity scale rating |
|---|---|
| 0 | 3 |
| 2 | 6 |
| 4 | 9+ |
| 6 | 10 |

These results show the effect of the process of this invention in converting a clear dispersion which yields a cloudy coating into one which yields a clear coating.

The product of this example contains pigment in the amount of about 50% of the weight of the polymer and about 5.8% of the total weight of the mixture. It contains about 11% of polymer and about 17.3% of non-volatile solids (pigment and polymer).

The product is useful without modification as a golden colored clear coating composition, but ordinarily such composition will be used as an intermediate for compounding with other components in a manner such as that described in Example 3.

EXAMPLE 2

A portion of colloidal hydrous iron oxide pigment dispersion in xylene, as prepared in Example 1, is subjected to centrifuging whereby the larger and heavier pigment particles, in the amount of about 25% by weight based on the total pigment, are removed and discarded. The remaining product is adjusted to contain about 40% pigment and 60% xylene. Removing the larger pigment particles makes possible the preparation of a product which imparts improved flashiness or polychromatic color effect when used as a component in finished lacquers containing aluminum flake pigments.

A clear dispersion of the centrifuged fatty acid treated pigment in a polymer of methyl methacrylate, which yields a clear dry coating in accordance with this invention, is prepared using the following components in the proportions indicated:

| | Parts |
|---|---|
| Centrifuged pigment dispersion in xylene (40% solids, as prepared above) | 175 |
| Toluene | 292 |
| Polymer of methyl methacrylate (40% solution in acetone and toluene) | 233 |
| | 700 |

The polymer of methyl methacrylate is the same as in Example 1.

The procedure is the same as in Example 1 except that, in addition, the mixture is heated to 115°–125° F. Samples are taken immediately before heating and at 1, 1.5 and 3 hour intervals. The clarity of dry flow-outs of the samples is compared as in Example 1, with the following results:

| Hours of ageing at 115°–125° F.: | Clarity scale rating |
|---|---|
| 0 | 5 |
| 1 | 7 |
| 1.5 | 9 |
| 3 | 9+ |

The results show the effect of combined agitation and heating. Ageing for only one hour did not ripen the mixture but 1.5 hours' ageing was sufficient.

The product of this example contains pigment in the amount of about 75% of the weight of the polymer and about 10% of the weight of the mixture. It contains about 13.3% of polymer and about 23.3% of non-volatile solids (pigment and polymer).

EXAMPLE 3

A green polychromatic lacquer adapted for use as a topcoat lacquer for automobile bodies is prepared from the clear pigmented dispersion produced in Example 2 by mixing it with other components in the following proportions:

| | Parts |
|---|---|
| Product of Example 2 | 113 |
| Polymer of methyl methacrylate (40% solution in acetone and toluene same as in Example 1) | 83 |
| Pigment dispersion, roller-milled | 166 |
|   Polymer of methyl methacrylate (homopolymer, relative viscosity 1.16, 40% solution in acetone and toluene) 98 | |
|   Amine-treated bentonite pigment ("Bentone" 34, National Lead Co.) 5 | |
|   Phthalocyanine green pigment 5 | |
|   Xylene 58 | |
| Nitrocellulose solution (2.4% solution of 350 second viscosity grade in lacquer solvents) | 124 |
| Aluminum pigment dispersion: | 29 |
|   Aluminum paste (65% flake pigment, 35% mineral spirits and naphtha; Aluminum Co. of America #222 Tinting Paste) 2 | |
|   Polymer of methyl methacrylate (homopolymer, relative viscosity 1.16, 40% solution in acetone and toluene) 17 | |
|   Xylene 10 | |
| Benzyl butyl phthalate plasticizer | 31 |
| | 546 |

EXAMPLE 4

| First portion: | Parts |
|---|---|
| Polymer of methyl methacrylate (homopolymer, relative viscosity 1.18, 40% solution in acetone and toluene) | 200 |
| Toluene | 600 |
| Second portion: | |
| "Midas Gold" 6289 (40% higher fatty acid treated colloidal hydrous iron oxide pigment, 60% toluene; RBH Dispersions, Division of Interchemical Corp.) | 75 |
| Toluene | 125 |
| | 1000 |

The components of the first portion and of the second portion are separately mixed until uniform. The two resulting mixtures are then mixed together. A sample of resulting clear product is taken immediately and is flowed out on a clear glass panel. The remaining charge is divided into two equal parts. One part is agitated at 120° F. The other part is agitated at room temperature, about 70° F. Samples of each are taken periodically and are flowed out. It is determined that, after 5 days of agitation at room temperature, the mixture has improved in clarity (measured on dry coating) from an initial clarity scale rating of about 5 to a final rating of about 9. It takes only one day of agitation at 120° F. to yield the same effect.

The product of this example contains pigment in the amount of about 37.5% of the weight of the polymer and about 3% of the weight of the mixture. It contains about 8% of polymer and about 11% of non-volatile solids (pigment and polymer).

EXAMPLE 5

First portion: Parts
    Polymer of methyl methacrylate (same as in Example 1) _____ 375.0
    Methyl ethyl ketone_____ 625.0
Second portion:
    "Midas Gold" 6289 (same as in Example 4)__ 187.5
    Methyl ethyl ketone_____ 312.5
                                         1500.0

The components of the first portion and of the second portion are separately mixed until uniform, in each case the methyl ethyl ketone being added slowly. The two resulting mixtures are then mixed together by adding the first portion slowly to the second portion with agitation. A sample of the clear product is taken immediately and is flowed out on a clear glass panel. The remaining charge is divided into two equal parts. One part is agitated at room temperature, about 70° F., for 20 hours, and a sample is then flowed out. The other part is agitated at about 110° F. for 20 hours, and a sample is then flowed out. The clarity of the dry coatings of the samples is compared as in Example 1, with the following results:

Clarity scale rating
Initial sample_____ 3
Agitation at 70° F., 20 hours_____ 9
Agitation at 110° F., 20 hours_____ 10

The results show the advantage of heating in effecting ripening.

The product of this example contains pigment in the amount of about 50% of the weight of the polymer and about 5% of the weight of the mixture. It contains about 10% of polymer and about 15% of non-volatile solids (pigment and polymer).

EXAMPLE 6

The procedure of Example 1 is repeated except for substituting an equal weight of refined tall oil acids for the coconut oil acids. The results are substantially the same.

The foregoing detailed description has been given for clearness of understanding only and no unnecessary limitations are to be understood therefrom. The invention is not limited to the exact details shown and described for obvious modifications will appear to those skilled in the art and any departure from the description herein which conforms to the principles of the invention is intended to be included in the scope of the claims below.

I claim:

1. The process of preparing a liquid coating composition which comprises mixing a clear solution of a polymer of methyl methacrylate having a relative viscosity of 1.117–1.196, as an essential film-forming constituent, with a clear dispersion of a pigment which is a reaction product of colloidal hydrous iron oxide and a fatty acid having at least 4 carbon atoms in proportions such that the weight of said polymer is at least equal to the weight of said pigment and, based on the total weight of the resulting fluid mix, the pigment constitutes up to 15% and the non-volatile constituents constitute up to 35%, to provide a clear fluid mixture which, as freshly prepared, yields a cloudy film when applied as a coating and dried, and then heating said mixture until it yields a clear film when applied as a coating and dried, said relative viscosity being the quotient obtained by dividing the efflux time of a solution of 0.25 gram of said polymer of methyl methacrylate in 50 cc. of ethylene dichloride by the efflux time of ethylene dichloride, said efflux times being measured in accordance with the procedure of ASTM–D–445–46T, Method B, at 25° C. using a modified Ostwald viscosimeter, Series 50.

2. A process of claim 1 in which the polymer of methyl methacrylate has a relative viscosity of 1.148–1.183, the pigment constitutes 25%–75% of the weight of said polymer and, based upon the total weight of the fluid mix, said pigment constitutes 3%–10% and non-volatile solids constitute 10%–25%, and the heating is carried out at a temperature above about 80° F. while agitating.

3. A liquid coating composition adapted for application to provide a decorative topcoat which comprises a product of the process of claim 1 to which there is added and intimately admixed therewith pigment providing hiding power, organic film-forming material, and a plasticizer for the polymer of methyl methacrylate.

References Cited in the file of this patent

UNITED STATES PATENTS

| | | |
|---|---|---|
| 2,384,579 | Vesce | Sept. 11, 1945 |
| 2,445,770 | Fischer | July 27, 1948 |
| 2,642,404 | Pike | June 16, 1953 |
| 2,662,027 | Pike | Dec. 8, 1953 |

OTHER REFERENCES

Handbook of Plastics, Second Edition, pages 277–279, 268–270, 665–666, D. Van Nostrand, 1949.

Schildknecht: Vinyl and Related Polymers, page 214–220, 246–249, John Wiley (1952).